(12) United States Patent
Lin et al.

(10) Patent No.: US 11,599,702 B2
(45) Date of Patent: Mar. 7, 2023

(54) EXCITATION SOURCE PLANNING METHOD FOR ELECTRICAL SIMULATION AND SYSTEM THEREOF

(71) Applicant: Universal Scientific Industrial (Shanghai) Co., Ltd., Shanghai (CN)

(72) Inventors: Wei-Yuan Lin, Shanghai (CN); Ji-Min Lin, Shanghai (CN)

(73) Assignee: Universal Scientific Industrial (Shanghai) Co., Ltd., Shanghai (CN)

( * ) Notice: Subject to any disclaimer, the term of this patent is extended or adjusted under 35 U.S.C. 154(b) by 86 days.

(21) Appl. No.: 17/231,022

(22) Filed: Apr. 15, 2021

(65) Prior Publication Data
US 2022/0253585 A1      Aug. 11, 2022

(30) Foreign Application Priority Data
Feb. 8, 2021    (CN) .......................... 202110180628.4

(51) Int. Cl.
*G06F 30/392*      (2020.01)
*G06F 115/12*      (2020.01)

(52) U.S. Cl.
CPC ........ *G06F 30/392* (2020.01); *G06F 2115/12* (2020.01)

(58) Field of Classification Search
USPC ......................................................... 716/137
See application file for complete search history.

(56) References Cited

U.S. PATENT DOCUMENTS

2016/0253448 A1*    9/2016   Ogawa ................. H05K 3/0005
                                                        716/136

* cited by examiner

*Primary Examiner* — Bryce M Aisaka
(74) *Attorney, Agent, or Firm* — CKC & Partners Co., LLC

(57) ABSTRACT

An excitation source planning method for an electrical stimulation is proposed to plan an excitation source. A layout importing step is performed to drive a processing unit to import a PCB layout to an electromagnetic simulation software module. A port establishing step is performed to set the excitation source to be vertically disposed between a signal layer and a main ground layer. A model generating step is performed to perform the electrical simulation according to the excitation source to generate a three-dimensional simulation model corresponding to the PCB layout. When the signal layer is not electrically connected to the main ground layer, the electromagnetic simulation software module executes an extending step. The extending step is performed to provide a first metal unit to be connected to the signal layer, and reset the excitation source to be vertically disposed between the first metal unit and the main ground layer.

10 Claims, 12 Drawing Sheets

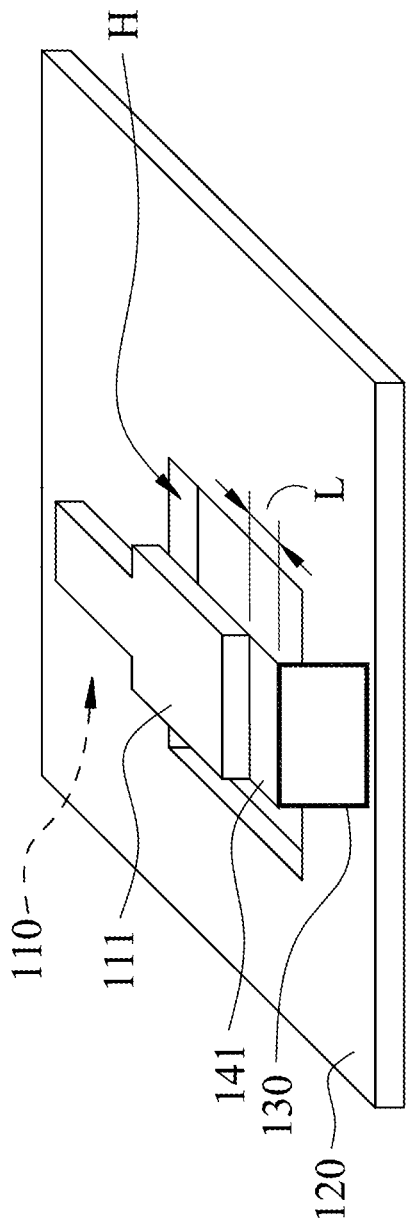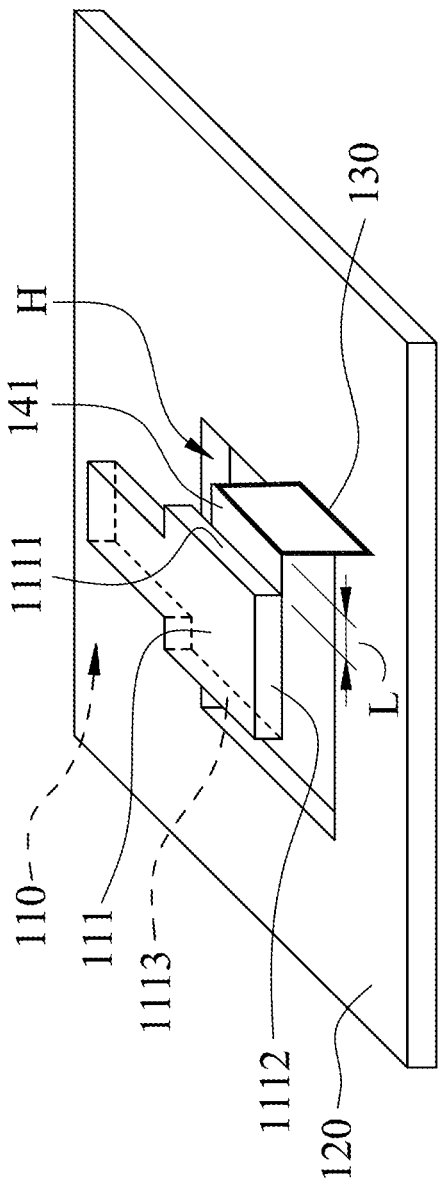

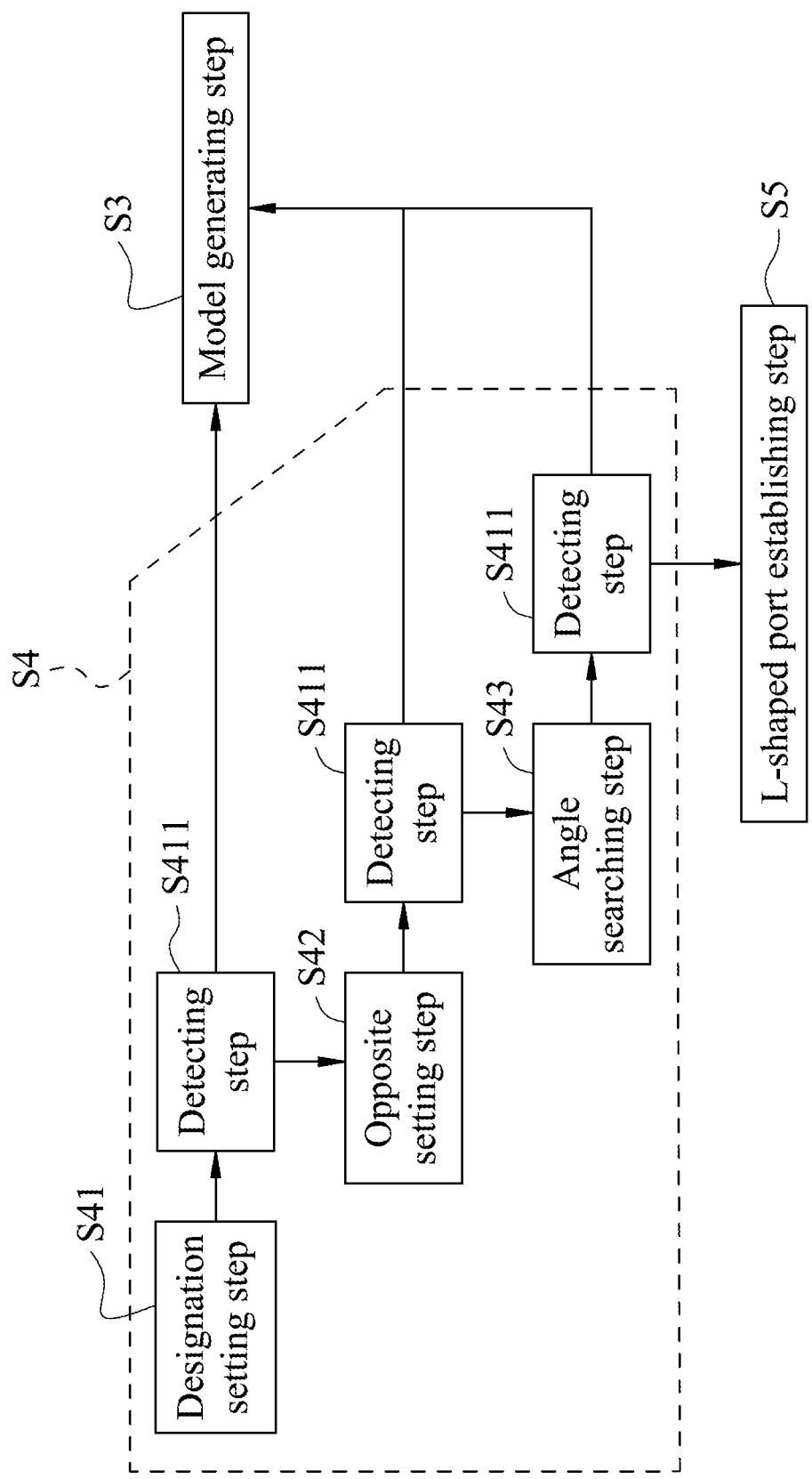

EXCITATION SOURCE PLANNING METHOD FOR ELECTRICAL SIMULATION AND SYSTEM THEREOF

RELATED APPLICATIONS

This application claims priority to China Application Serial Number 202110180628.4, filed Feb. 8, 2021, which is herein incorporated by reference.

BACKGROUND

Technical Field

The present disclosure relates to an excitation source planning method for an electrical simulation and a system thereof. More particularly, the present disclosure relates to an excitation source planning method for an electrical simulation based on a three-dimensional electromagnetic simulation software and a system thereof.

Description of Related Art

The electrical simulations of high-speed signals (e.g., PCIe4, USB3.2 or Thunderbolt communication protocol) or RF signals for accuracy are generally performed by a three-dimensional electromagnetic simulation software. The common simulation tools are ANSYS HFSS simulation software and CST simulation software. High Frequency Structure Simulator (HFSS) is a three-dimensional electromagnetic simulation software launched by ANSYS, Inc. With more and more functions and applications of HFSS and a model constructed from HFSS becoming more and more complex, it often takes a lot of time and energy for electrical simulation engineers to set a location of an excitation source in a construction procedure. The excitation source affects a flow loop of energy transfer and affects the accuracy of the final simulation result.

Electrical simulation engineers use HFSS simulation software according to the previous operating experience, and manually create objects for the excitation sources and delete the incorrect objects or add new objects. In the course of time, the cumbersome and time-consuming operations can easily cause human errors and reduce the accuracy of the final simulation results.

In view of the problems of the abovementioned HFSS simulation software, how to establish an automated solution based on HFSS simulation software to achieve automatically planning the excitation sources and maintaining the high accuracy of the final simulation result is highly anticipated by the public and becomes the goal of relevant industry efforts.

SUMMARY

According to one aspect of the present disclosure, an excitation source planning method for an electrical simulation is configured to plan an excitation source. The excitation source planning method for the electrical simulation includes performing a layout importing step, a port establishing step and a model generating step. The layout importing step is performed to drive a processing unit to import a printed circuit board (PCB) layout stored in a memory to an electromagnetic simulation software module. The PCB layout includes a signal layer and a main ground layer. The port establishing step is performed to drive the processing unit to execute the electromagnetic simulation software module, so that the electromagnetic simulation software module sets the excitation source to be vertically disposed between the signal layer and the main ground layer. The model generating step is performed to drive the processing unit to execute the electromagnetic simulation software module, so that the electromagnetic simulation software module performs the electrical simulation according to the excitation source to generate a three-dimensional simulation model corresponding to the PCB layout. In the port establishing step, in response to determining that the signal layer is not electrically connected to the main ground layer, the electromagnetic simulation software module executes an extending step. The extending step is performed to provide a first metal unit to be connected to the signal layer and to reset the excitation source to be vertically disposed between the first metal unit and the main ground layer, so that the signal layer is electrically connected to the main ground layer.

According to another aspect of the present disclosure, an excitation source planning system for an electrical simulation is configured to plan an excitation source. The excitation source planning system for the electrical simulation includes a memory and a processing unit. The memory is configured to access a printed circuit board (PCB) layout and an electromagnetic simulation software module. The PCB layout includes a signal layer and a main ground layer. The processing unit is electrically connected to the memory and configured to implement an excitation source planning method for an electrical simulation including performing a layout importing step, a port establishing step and a model generating step. The layout importing step is performed to import the PCB layout stored in the memory to the electromagnetic simulation software module. The port establishing step is performed to execute the electromagnetic simulation software module, so that the electromagnetic simulation software module sets the excitation source to be vertically disposed between the signal layer and the main ground layer. The model generating step is performed to execute the electromagnetic simulation software module, so that the electromagnetic simulation software module performs the electrical simulation according to the excitation source to generate a three-dimensional simulation model corresponding to the PCB layout. In the port establishing step, in response to determining that the signal layer is not electrically connected to the main ground layer, the electromagnetic simulation software module executes an extending step. The extending step is performed to provide a first metal unit to be connected to the signal layer and to reset the excitation source to be vertically disposed between the first metal unit and the main ground layer, so that the signal layer is electrically connected to the main ground layer.

BRIEF DESCRIPTION OF THE DRAWINGS

The present disclosure can be more fully understood by reading the following detailed description of the embodiment, with reference made to the accompanying drawings as follows:

FIG. 6A shows a three-dimensional schematic view of a printed circuit board layout in an extending step of FIG. 4.

FIG. 6B shows a three-dimensional schematic view of a printed circuit board layout in an angle searching step of FIG. 4.

FIG. 7 shows a flow chart of a bridge port establishing step, an L-shaped port establishing step and a model generating step of FIG. 3.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
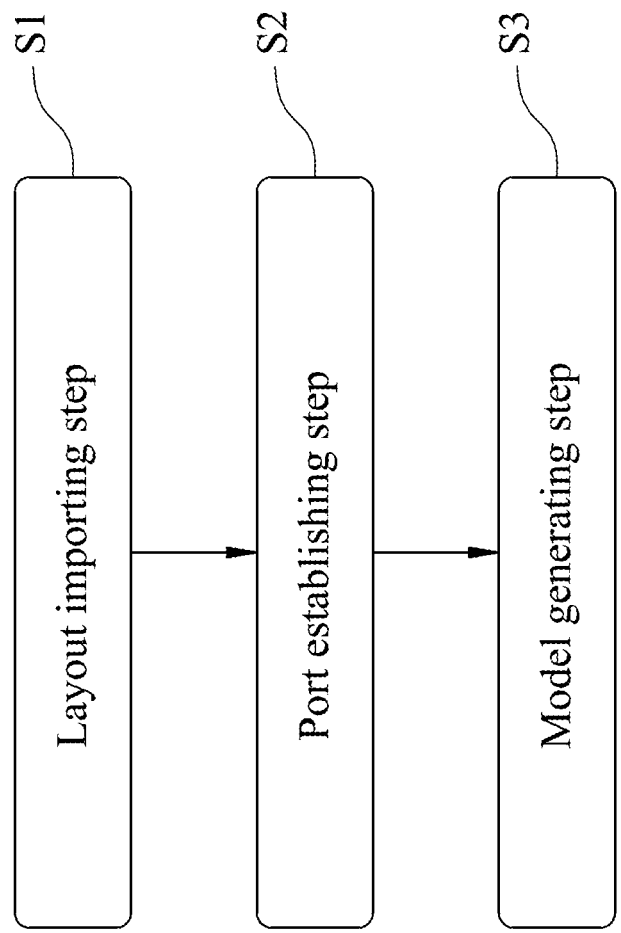
FIG. 1 shows a flow chart of an excitation source planning method for an electrical simulation according to a first embodiment of the present disclosure.
Figure 2:
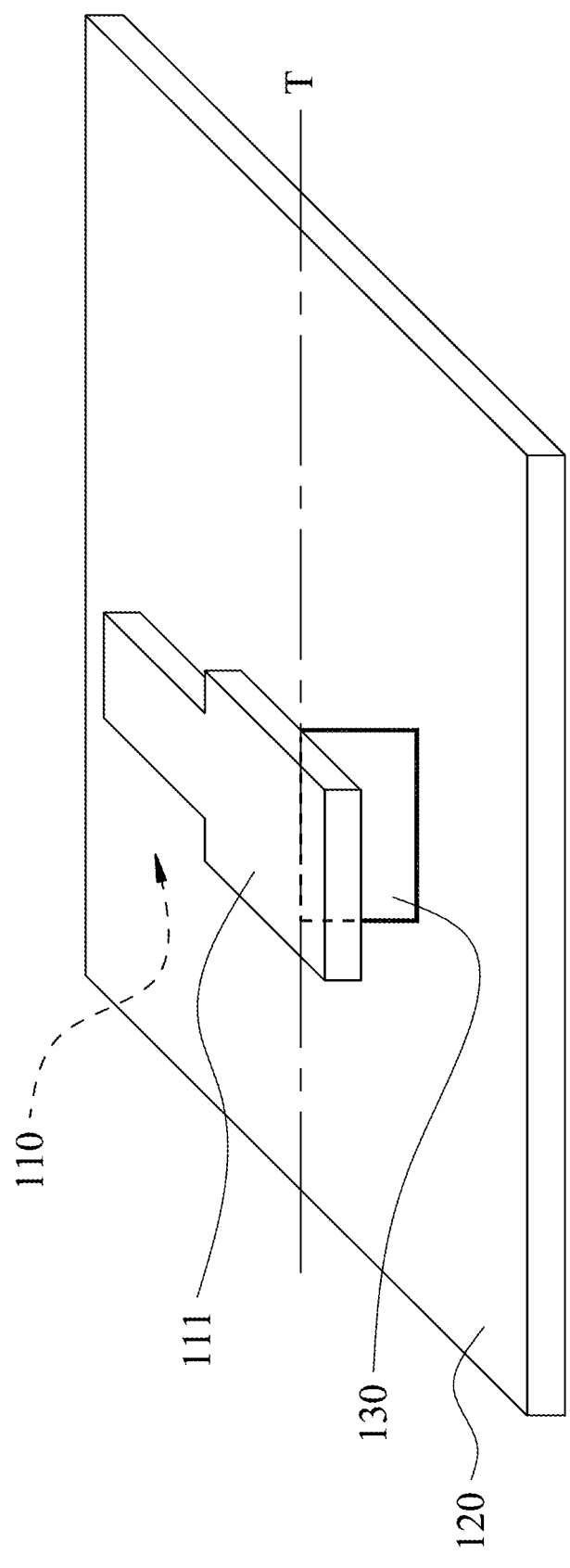
FIG. 2 shows a three-dimensional schematic view of a printed circuit board layout in a port establishing step of FIG. 1.

Please refer to FIGS. 1 and 2. FIG. 1 shows a flow chart of an excitation source planning method 10 for an electrical simulation according to a first embodiment of the present disclosure. FIG. 2 shows a three-dimensional schematic view of a printed circuit board layout 100 in a port establishing step S2 of FIG. 1. In FIGS. 1 and 2, the excitation source planning method 10 for the electrical simulation is configured to plan an excitation source 130 and includes performing a layout importing step S1, a port establishing step S2 and a model generating step S3.

The layout importing step S1 is performed to drive a processing unit to import a printed circuit board (PCB) layout 100 stored in a memory to an electromagnetic simulation software module. The electromagnetic simulation software module can be High Frequency Sounder System (HFSS) software and is configured to perform the electrical simulation for the PCB layout 100. The PCB layout 100 includes a signal layer 110 and a main ground layer 120, and the signal layer 110 includes a signal pad 111.

The port establishing step S2 is performed to drive the processing unit to execute the electromagnetic simulation software module, so that the electromagnetic simulation software module sets the excitation source 130 to be vertically disposed between the signal pad 111 of the signal layer 110 and the main ground layer 120.

The model generating step S3 is performed to drive the processing unit to execute the electromagnetic simulation software module, so that the electromagnetic simulation software module performs the electrical simulation according to the excitation source 130 to generate a three-dimensional simulation model corresponding to the PCB layout 100. Therefore, the excitation source planning method 10 for the electrical simulation of the present disclosure drives the electromagnetic simulation software module to automatically set the excitation source 130 at a position where the signal pad 111 of the signal layer 110 and the main ground layer 120 can form a loop so as to reduce the manual operation time of an electrical simulation engineer and avoid human error to improve the simulation accuracy of the three-dimensional simulation model for the PCB layout 100.

Figure 3:
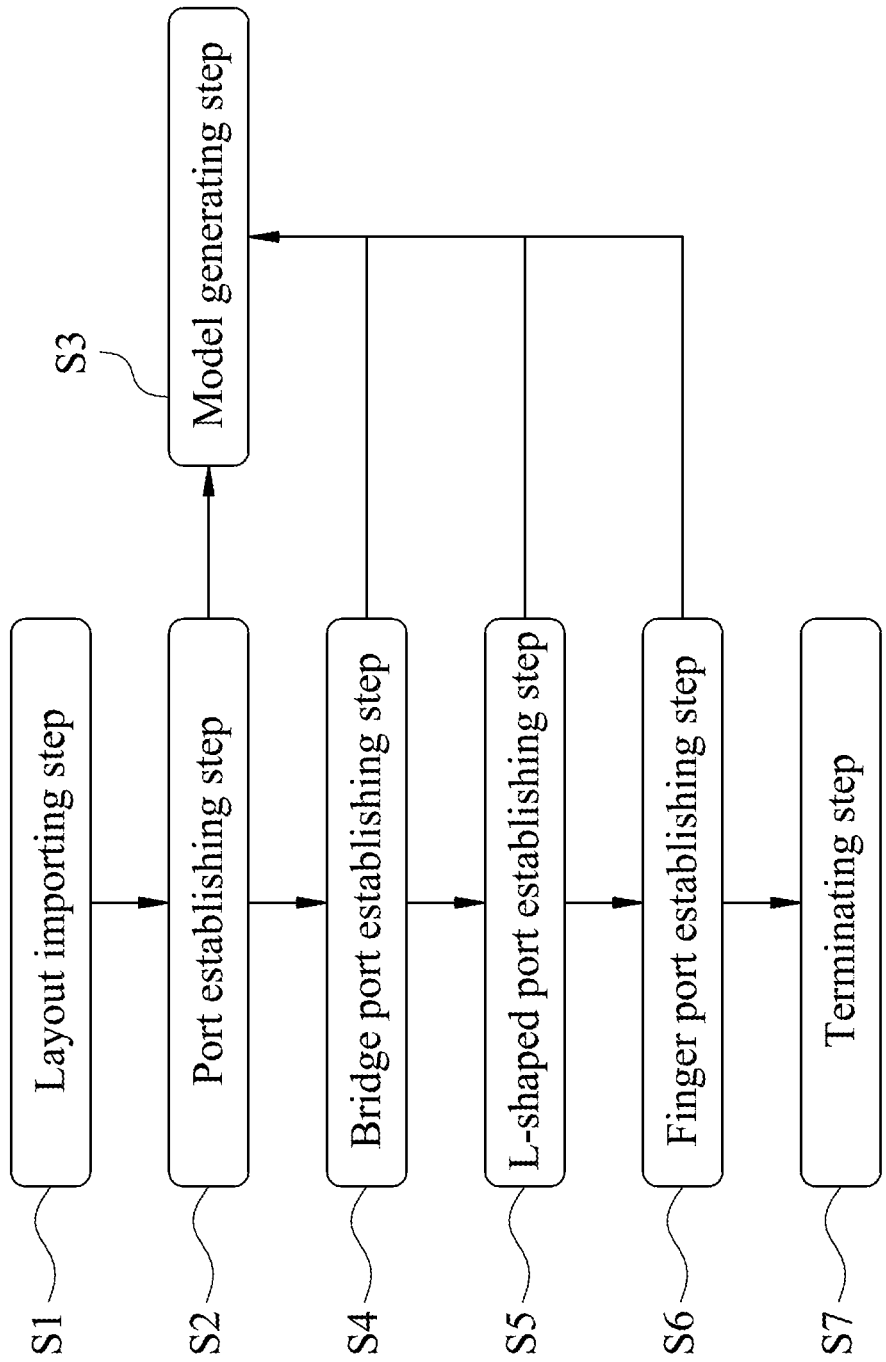
FIG. 3 shows a flow chart of an excitation source planning method for an electrical simulation according to a second embodiment of the present disclosure.
Figure 4:
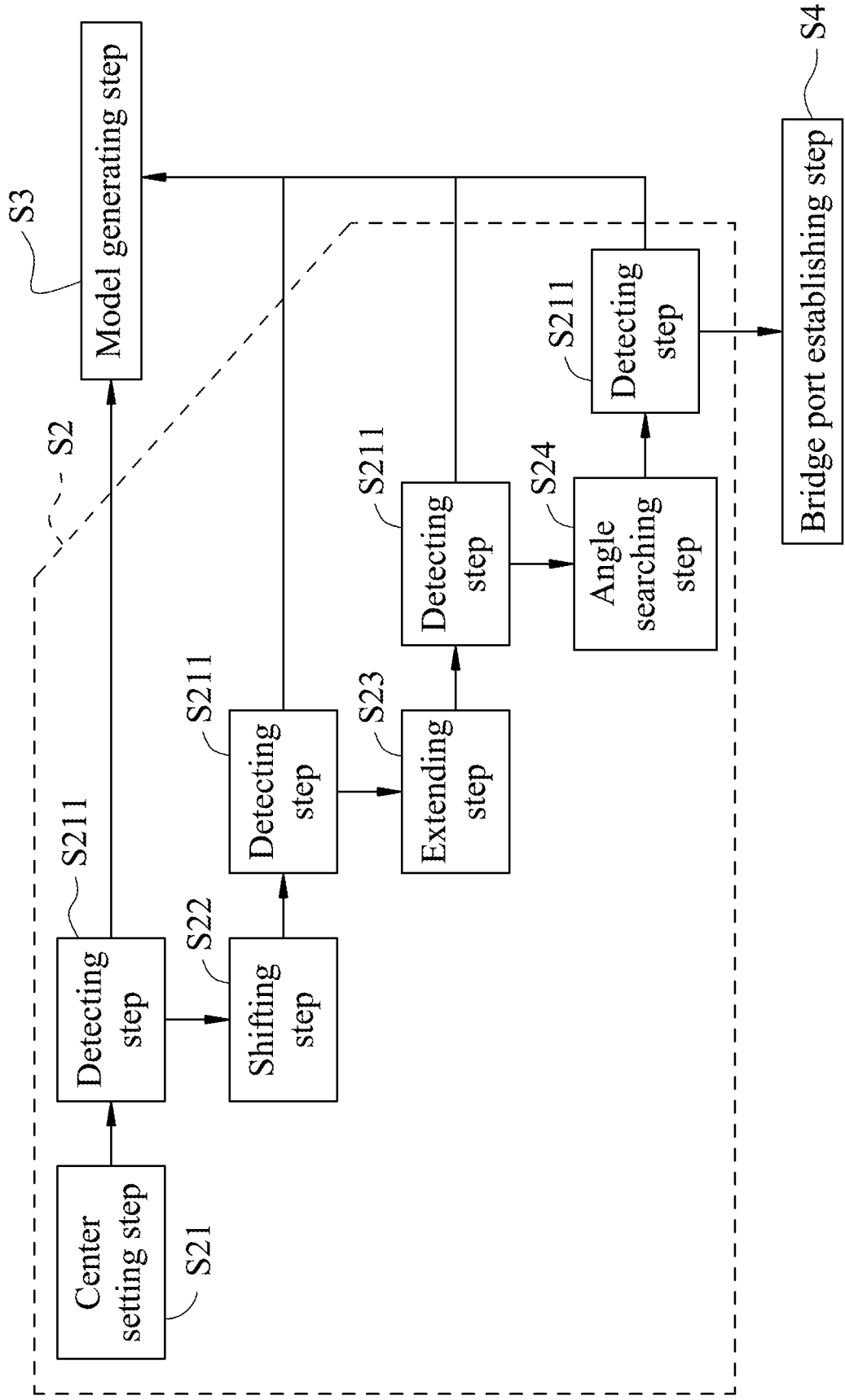
FIG. 4 shows a flow chart of a port establishing step, a bridge port establishing step and a model generating step of FIG. 3.
Figure 5A:
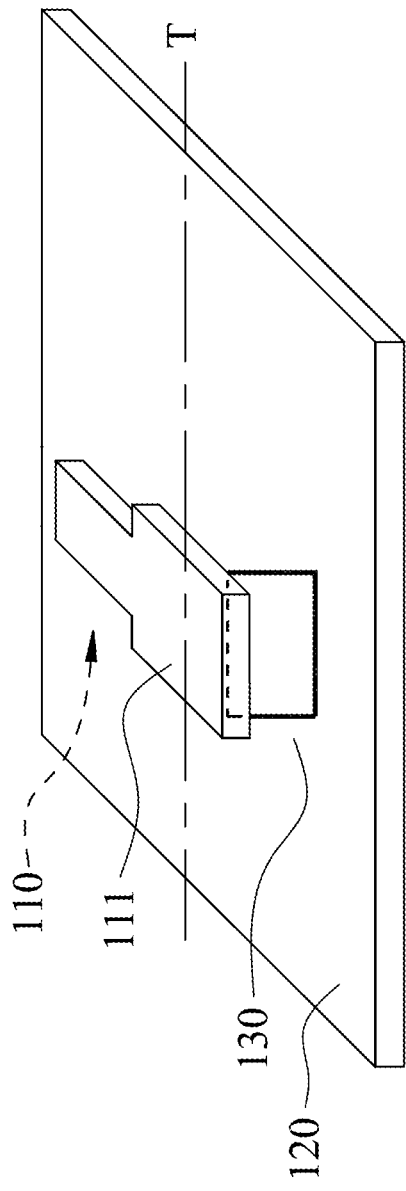
FIG. 5A shows a three-dimensional schematic view of a printed circuit board layout in a shifting step of FIG. 4.
Figure 5B:
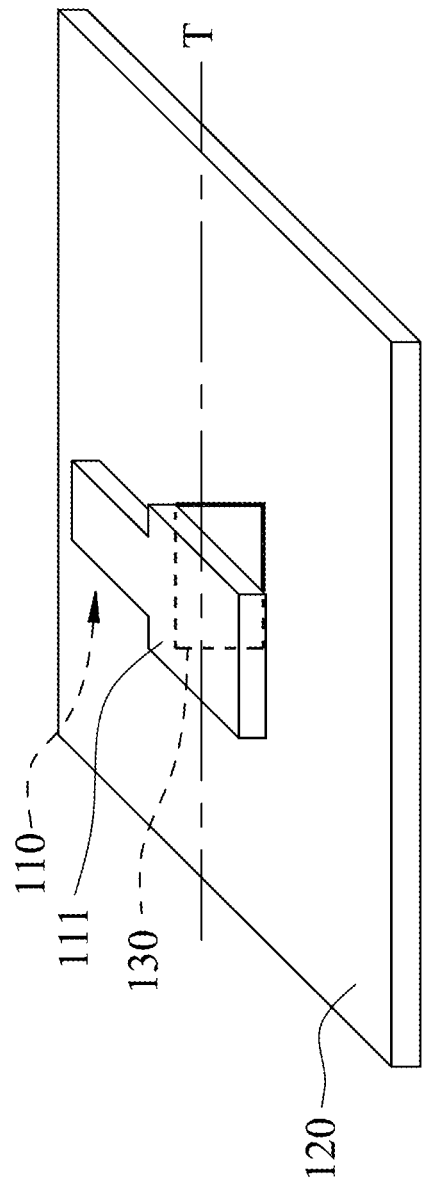
FIG. 5B shows another three-dimensional schematic view of a printed circuit board layout in the shifting step of FIG. 4.

Please refer to FIGS. 3, 4, 5A, 5B, 6A and 6B. FIG. 3 shows a flow chart of an excitation source planning method 10a for an electrical simulation according to a second embodiment of the present disclosure. FIG. 4 shows a flow chart of a port establishing step S2, a bridge port establishing step S4 and a model generating step S3 of FIG. 3. FIG. 5A shows a three-dimensional schematic view of a printed circuit board layout 100a in a shifting step S22 of FIG. 4. FIG. 5B shows another three-dimensional schematic view of a printed circuit board layout 100b in the shifting step S22 of FIG. 4. FIG. 6A shows a three-dimensional schematic view of a printed circuit board layout 100c in an extending step S23 of FIG. 4. FIG. 6B shows a three-dimensional schematic view of a printed circuit board layout 100d in an angle searching step S24 of FIG. 4. Specifically, the excitation source planning method 10a for the electrical simulation includes performing the layout importing step S1, the port establishing step S2, the model generating step S3, a bridge port establishing step S4, a L-shaped port establishing step S5, a Finger port establishing step S6 and a terminating step S7. In addition, the port establishing step S2 includes performing a center setting step S21, a plurality of detecting steps S211, a shifting step S22, an extending step S23 and an angle searching step S24.

In the center setting step S21, the electromagnetic simulation software module sets the excitation source 130 to be connected to the signal pad 111 along a middle tangent T (as shown in FIG. 2). Then, the electromagnetic simulation software module executes one of the detecting steps S211.

In the detecting step S211, the electromagnetic simulation software module detects whether the signal pad 111 is electrically connected to the main ground layer 120. In response to determining that the signal pad 111 is electrically connected to the main ground layer 120, the electromagnetic simulation software module executes the model generating step S3. In response to determining that the signal pad 111 is not electrically connected to the main ground layer 120 or the signal pad 111 is short-circuited with other metal layers and other metal lines above the main ground layer 120, the electromagnetic simulation software module executes the shifting step S22.

In the shifting step S22, the electromagnetic simulation software module sets the excitation source 130 to be connected to two sides of the signal pad 111 based on the middle tangent T (as shown in FIGS. 5A and 5B), and successively executes the detecting step S211. In response to determining that the signal pad 111 is electrically connected to the main ground layer 120, the electromagnetic simulation software module executes the model generating step S3. In response to determining that the signal pad 111 is still not electrically connected to the main ground layer 120 or a region corresponding to the signal pad 111 to the main ground layer 120 is a through hole H (as shown in FIG. 6A or 6B), the electromagnetic simulation software module executes the extending step S23.

In the extending step S23, the electromagnetic simulation software module provides a first metal unit 141 to be connected to the signal pad 111 and resets the excitation source 130 to be vertically disposed between the first metal unit 141 and the main ground layer 120, so that the signal pad 111 of the signal layer 110 is electrically connected to the main ground layer 120 (as shown in FIG. 6A), and successively executes the detecting step S211. The first metal unit 141 can be a perfect electric conductor (PEC) and has a length L. In response to determining that the signal pad 111 is electrically connected to the main ground layer 120 through the first metal unit 141, the electromagnetic simulation software module executes the model generating step S3. Especially, the electromagnetic simulation software module can include a length threshold and sets the length threshold to be 20 mil, but the present disclosure is not limited thereto. The length L of the first metal unit 141 is less than or equal to the length threshold. Therefore, in response to determining that the signal pad 111 is not electrically connected to the main ground layer 120 through the first metal unit 141, the electromagnetic simulation software module executes the angle searching step S24.

In the angle searching step S24, the electromagnetic simulation software module resets the first metal unit 141 to be connected to a first surface 1111, a second surface 1112 or a third surface 1113 of the signal pad 111 (as shown in FIG. 6B), and successively executes the detecting step S211. In detail, the electromagnetic simulation software module resets the first metal unit 141 to be connected to the surface of the signal pad 111 in all directions or angles, and resets the excitation source 130 to be vertically disposed between the first metal unit 141 and the main ground layer 120, so that the signal pad 111 of the signal layer 110 can be electrically connected to the main ground layer 120 through the first metal unit 141. In response to determining that the signal pad 111 is electrically connected to the main ground layer 120, the electromagnetic simulation software module executes the model generating step S3. In response to determining that the signal pad 111 is still not electrically connected to the main ground layer 120, the electromagnetic simulation software module executes the bridge port establishing step S4.

Figure 8A:
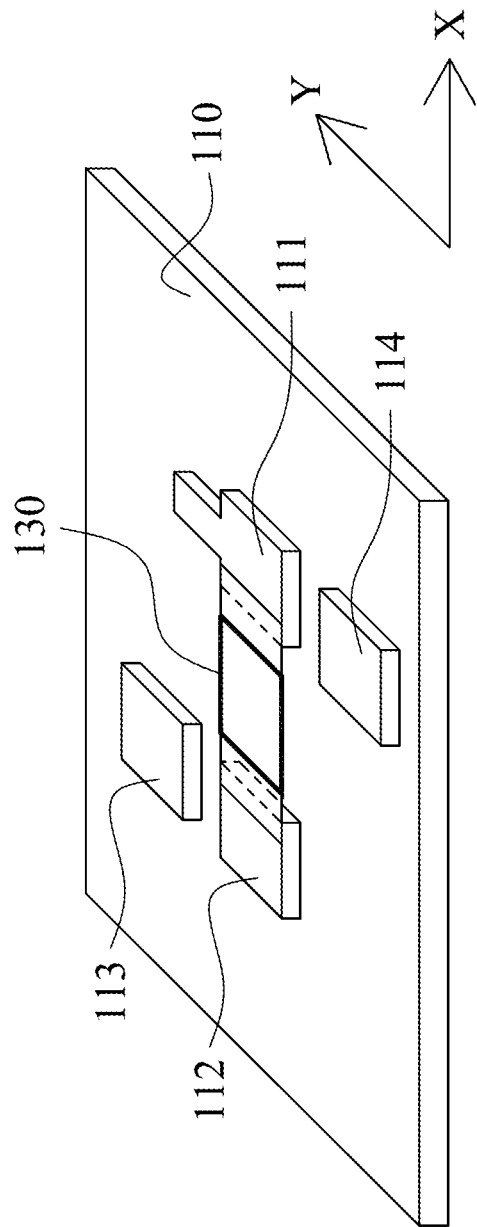
FIG. 8A shows a three-dimensional schematic view of a printed circuit board layout in a designation setting step of FIG. 7.
Figure 8B:
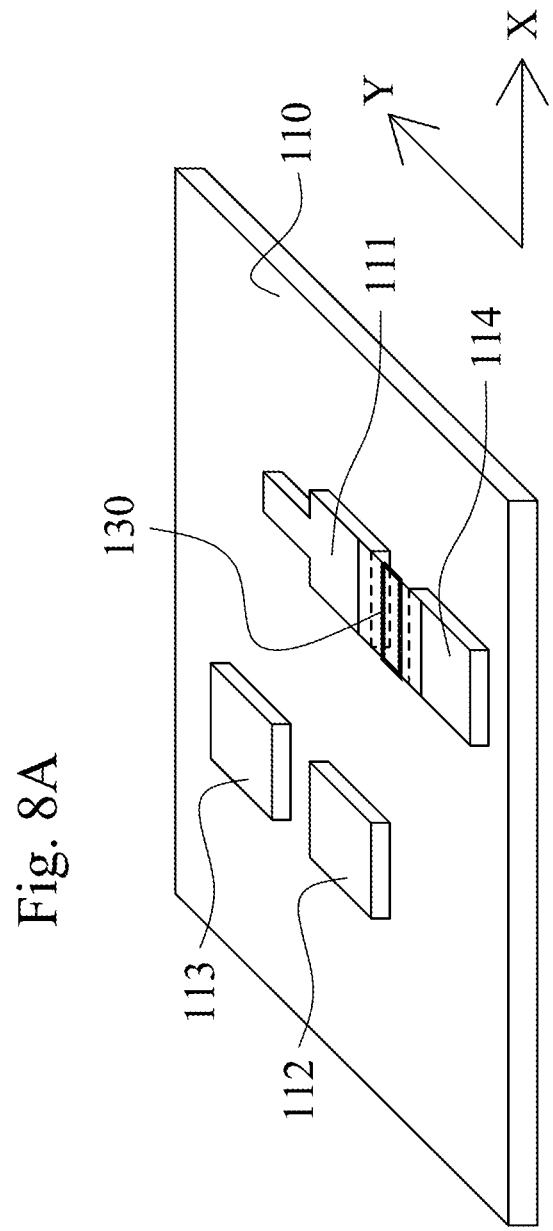
FIG. 8B shows a three-dimensional schematic view of a printed circuit board layout in an opposite setting step of FIG. 7.

Please refer to FIGS. 7, 8A and 8B. FIG. 7 shows a flow chart of the bridge port establishing step S4, the L-shaped port establishing step S5 and the model generating step S3 of FIG. 3. FIG. 8A shows a three-dimensional schematic view of a printed circuit board layout 100e in a designation setting step S41 of FIG. 7. FIG. 8B shows a three-dimensional schematic view of a printed circuit board layout 100f in an opposite setting step S42 of FIG. 7. In FIG. 7, the bridge port establishing step S4 includes performing a designation setting step S41, a plurality of detecting steps S411, an opposite setting step S42 and an angle searching step S43.

In the designation setting step S41, the signal layer 110 includes the signal pad 111 and a plurality of ground pads 112, 113, 114, but the present disclosure is not limited thereto. The electromagnetic simulation software module resets the excitation source 130 to be horizontally disposed between the signal pad 111 and the ground pad 112 according to a component database, so that the signal pad 111 is electrically connected to the ground pad 112 (as shown in FIG. 8A), and successively executes the detecting step S411. In detail, the component database is defined that the signal pad 111 needs to be connected to a specific location (i.e., the ground pad 112) on the signal layer 110. Furthermore, in the detecting step S411, the electromagnetic simulation software module detects whether the signal pad 111 is electrically connected to one of the ground pads 112, 113, 114 on the signal layer 110. In response to determining that the signal pad 111 is electrically connected to the ground pad 112, the electromagnetic simulation software module executes the model generating step S3. In response to determining that the signal pad 111 is still not electrically connected to the ground pad 112, the electromagnetic simulation software module executes the opposite setting step S42.

In the opposite setting step S42, the electromagnetic simulation software module resets the excitation source 130 to be horizontally disposed between the signal pad 111 and the ground pad 114. The ground pad 114 is opposite to the signal pad 111 (as shown in FIG. 8B). The electromagnetic simulation software module successively executes the detection step S411. In response to determining that the signal pad 111 is electrically connected to the ground pad 114, the electromagnetic simulation software module executes the model generating step S3. In response to determining that the signal pad 111 is still not electrically connected to the ground pad 114, the electromagnetic simulation software module executes the angle searching step S43.

In the angle searching step S43, the electromagnetic simulation software module sets the excitation source 130 to be connected to a surface position of the signal pad 111 corresponding to a positive X-axis, a negative X-axis, a positive Y-axis or a negative Y-axis direction, and successively executes the detecting step S411. In response to determining that the signal pad 111 is electrically connected to the ground pad 112, the ground pad 113 or the ground pad 114, the electromagnetic simulation software module executes the model generating step S3. In response to determining that the signal pad 111 is still not electrically connected to the ground pad 112, the ground pad 113 or the ground pad 114, the electromagnetic simulation software module executes the L-shaped port establishing step S5.

Figure 9:
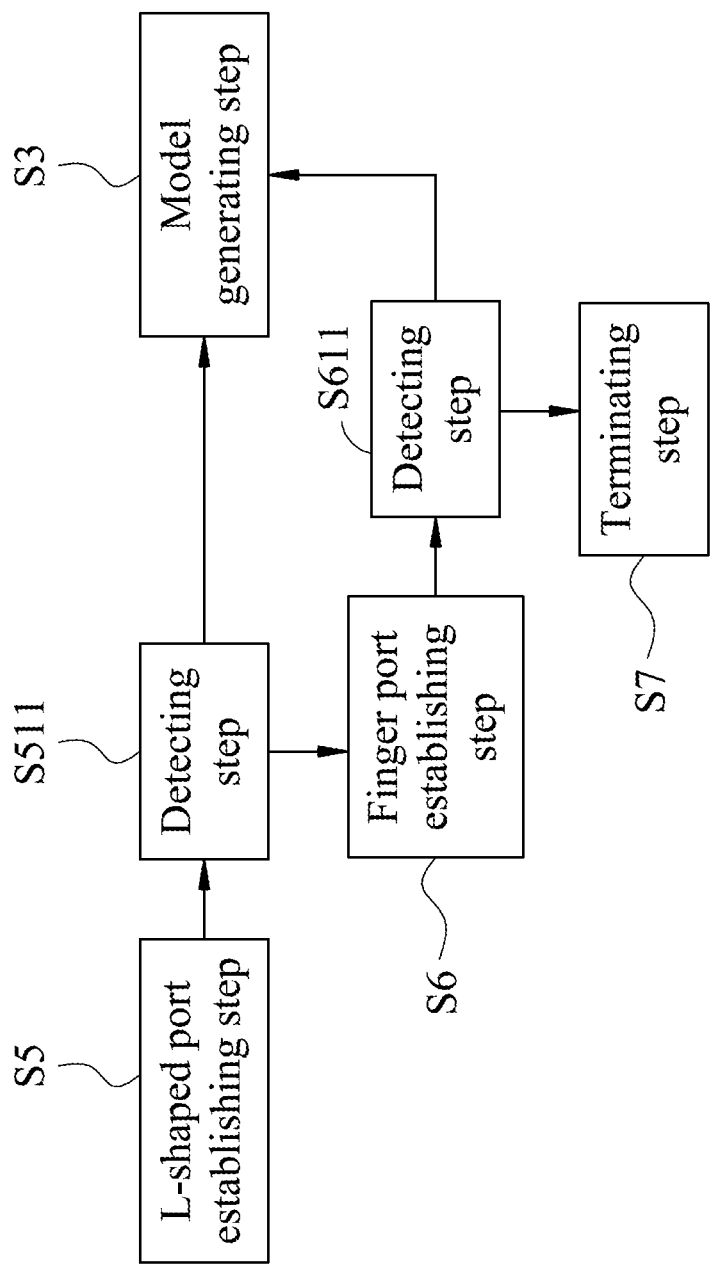
FIG. 9 shows a flow chart of an L-shaped port establishing step, a finger port establishing step, a terminating step and a model generating step of FIG. 3.
Figure 10:
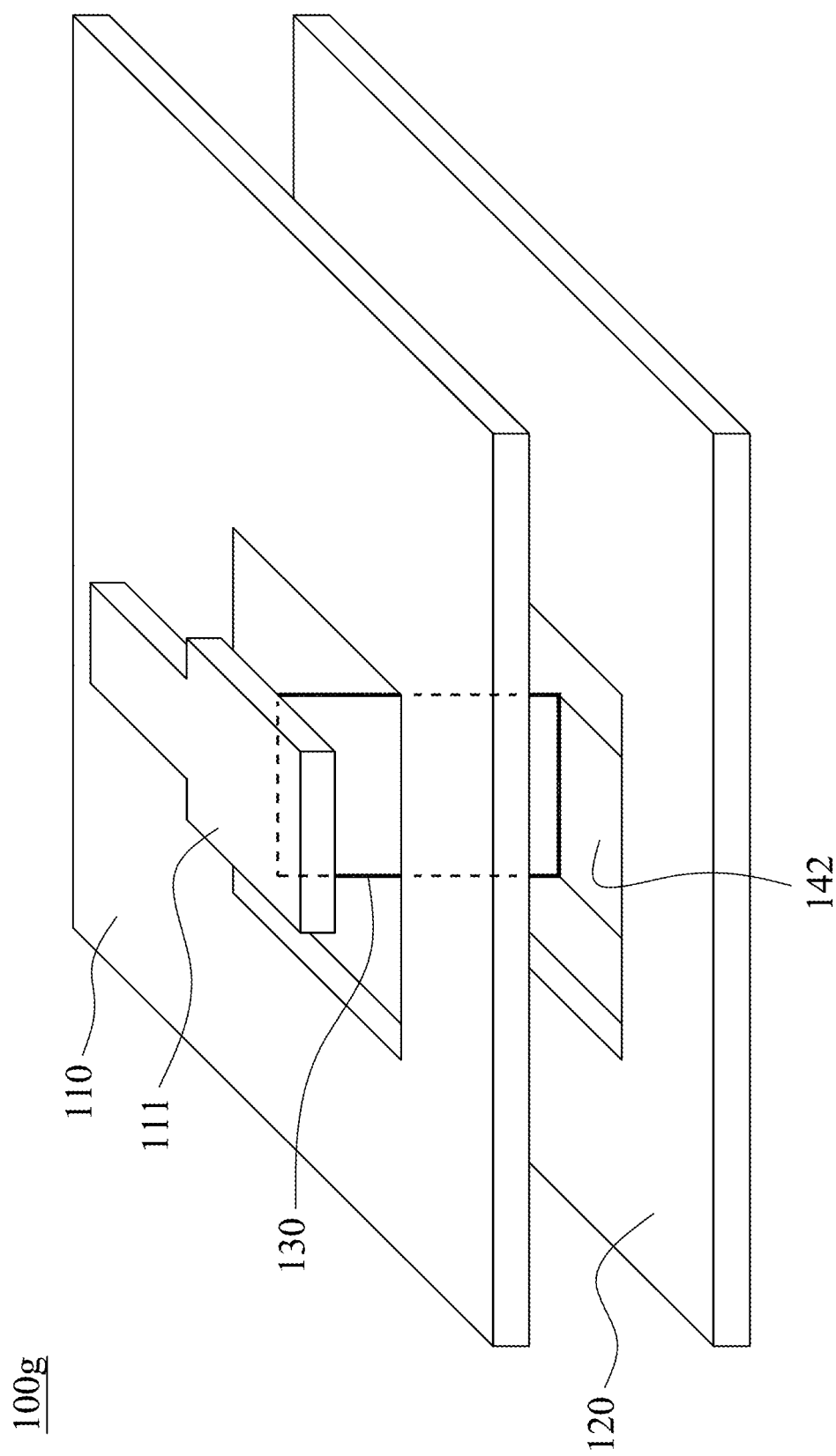
FIG. 10 shows a three-dimensional schematic view of a printed circuit board layout in the L-shaped port establishing step of FIG. 9.
Figure 11:
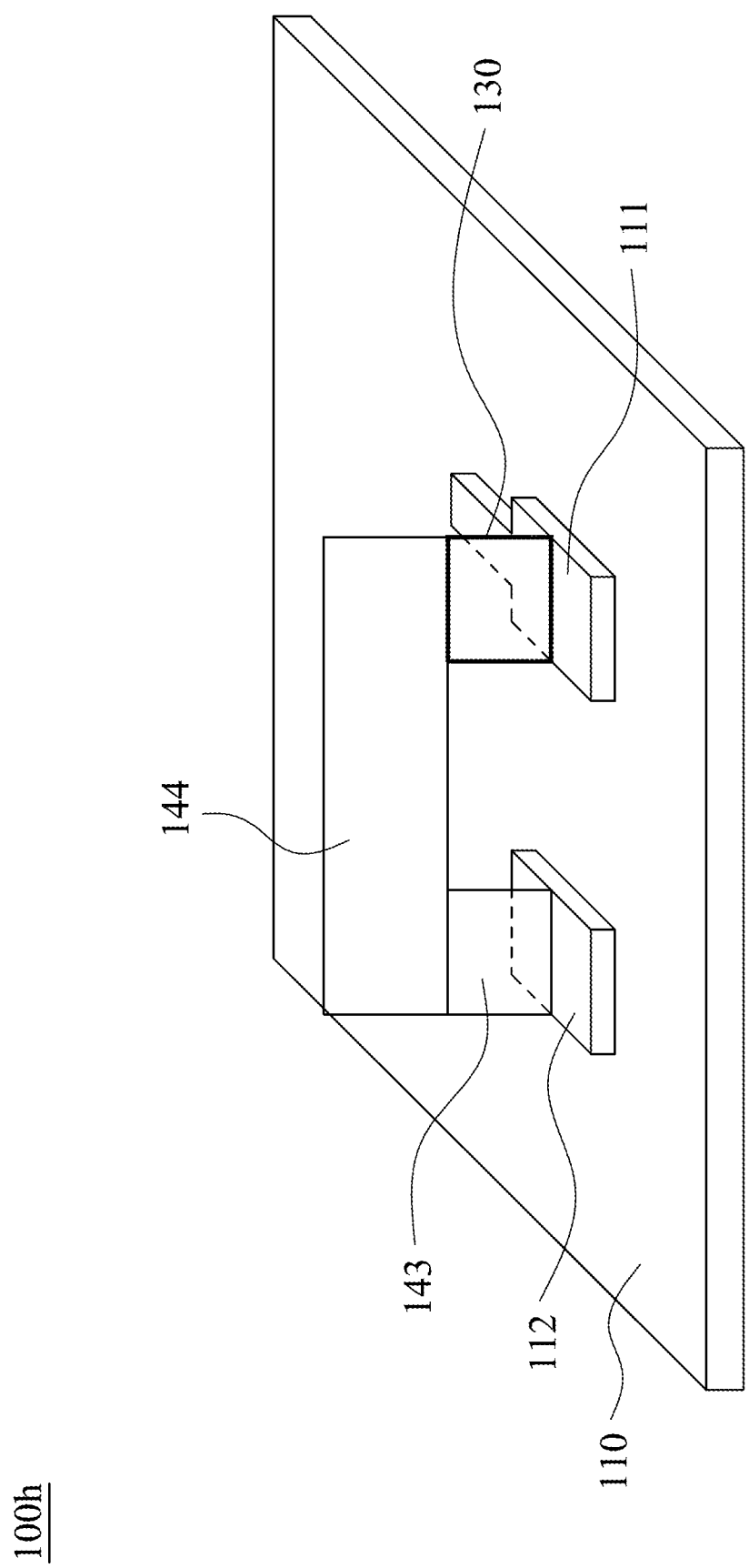
FIG. 11 shows a three-dimensional schematic view of a printed circuit board layout in the finger port establishing step of FIG. 9.

Please refer to FIGS. 9, 10 and 11. FIG. 9 shows a flow chart of the L-shaped port establishing step S5, the finger port establishing step S6, the terminating step S7 and the model generating step S3 of FIG. 3. FIG. 10 shows a three-dimensional schematic view of a printed circuit board layout 100g in the L-shaped port establishing step S5 of FIG. 9. FIG. 11 shows a three-dimensional schematic view of a printed circuit board layout 100h in the finger port establishing step S6 of FIG. 9. In the L-shaped port establishing step S5, the electromagnetic simulation software module provides a second metal unit 142 to be horizontally connected to the main ground layer 120, and resets the excitation source 130 to be vertically disposed between the signal pad 111 and the second metal unit 142 (as shown in FIG. 10), so that the signal layer 110 is electrically connected to the main ground layer 120. Successively, the electromagnetic simulation software module executes a detecting step S511. The detection step S511 is performed to drive the electromagnetic simulation software module to detect whether the signal layer 110 is electrically connected to the main ground layer 120. In response to determining that the signal pad 111 is electrically connected to the main ground layer 120 through the second metal unit 142, the electromagnetic simulation software module executes the model generating step S3. In response to determining that the signal pad 111 is not electrically connected to the main ground layer 120 through the second metal unit 142, the electromagnetic simulation software module executes the finger port establishing step S6.

In the finger port establishing step S6, the electromagnetic simulation software module provides a third metal unit 143 to be vertically disposed on the ground pad 112, and then provides a fourth metal unit 144 to be horizontally disposed on the third metal unit 143. The electromagnetic simulation software module resets the excitation source 130 to be vertically disposed between the fourth metal unit 144 and the signal pad 111, so that the signal pad 111 is electrically connected to the ground pad 112 (as shown in FIG. 11). Successively, the electromagnetic simulation software module executes a detecting step S611. The detecting step S611 is performed to drive the electromagnetic simulation software module to detect whether the signal pad 111 is electrically connected to the ground pad 112. In response to determining that the signal pad 111 is electrically connected to the ground pad 112, the electromagnetic simulation software module executes the model generating step S3. In response to determining that the signal pad 111 is still not electrically connected to the ground pad 112, the electromagnetic simulation software module executes the terminating step S7. In addition, the terminating step S7 is performed to drive the processing unit to terminate the electromagnetic simulation software module and generate a termination message. The termination message displays an adjustment window, so that the electrical simulation engineer can manually adjust the length threshold of the electromagnetic simulation software module. Therefore, the electrical simulation engineer can turn up the length threshold and re-executes the electromagnetic simulation software module.

Figure 12:
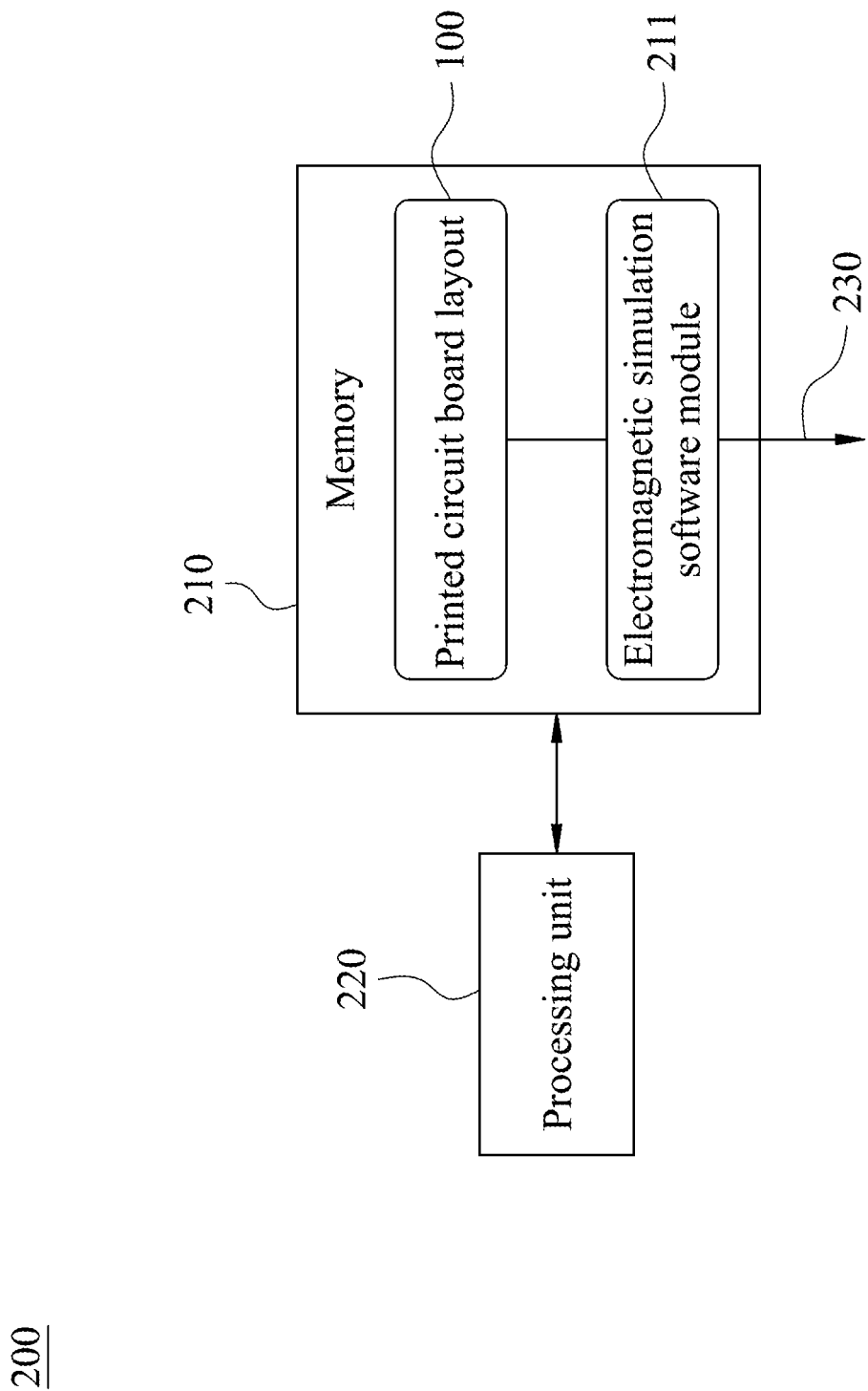
FIG. 12 shows a block diagram of an excitation source planning system for an electrical simulation according to a third embodiment of the present disclosure.

Please refer to FIGS. 1, 2 and 12. FIG. 12 shows a block diagram of an excitation source planning system 200 for the electrical simulation according to a third embodiment of the present disclosure. The excitation source planning system 200 for the electrical simulation is configured to plan the excitation source 130 and includes a memory 210 and a processing unit 220. The memory 210 is configured to access the PCB layout 100 and the electromagnetic simulation software module 211. The PCB layout 100 includes the signal layer 110 and the main ground layer 120, and the signal layer 110 includes the signal pad 111. The processing unit 220 is electrically connected to the memory 210 and configured to implement performing a layout importing step S1, a port establishing step S2 and a model generating step S3. The layout importing step S1 is performed to import the PCB layout 100 stored in the memory 210 to the electromagnetic simulation software module 211. The port establishing step S2 is performed to execute the electromagnetic simulation software module 211, so that the electromagnetic simulation software module 211 sets the excitation source 130 to be vertically disposed between the signal pad 111 of the signal layer 110 and the main ground layer 120. The model generating step S3 is performed to execute the electromagnetic simulation software module 211, so that the electromagnetic simulation software module 211 performs the electrical simulation according to the excitation source 130 to generate a three-dimensional simulation model 230 corresponding to the PCB layout 100.

Therefore, the excitation source planning system 200 for the electrical simulation of the present disclosure programs a manner about artificially setting the excitation source 130, so that the electromagnetic simulation software module 211 automatically sets the excitation source 130 at a position where the signal pad 111 of the signal layer 110 and the main ground layer 120 form a loop so as to automatically generate the three-dimensional simulation model 230.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An excitation source planning method for an electrical simulation, which is configured to plan an excitation source, the excitation source planning method for the electrical simulation comprising:
   performing a layout importing step to drive a processing unit to import a printed circuit board (PCB) layout stored in a memory to an electromagnetic simulation software module, wherein the PCB layout comprises a signal layer and a main ground layer;
   performing a port establishing step to drive the processing unit to execute the electromagnetic simulation software module, so that the electromagnetic simulation software module sets the excitation source to be vertically disposed between the signal layer and the main ground layer; and
   performing a model generating step to drive the processing unit to execute the electromagnetic simulation software module, so that the electromagnetic simulation software module performs the electrical simulation according to the excitation source to generate a three-dimensional simulation model corresponding to the PCB layout;
   wherein in the port establishing step, in response to determining that the signal layer is not electrically connected to the main ground layer, the electromagnetic simulation software module executes an extending step, and the extending step is performed to provide a first metal unit to be connected to the signal layer and to reset the excitation source to be vertically disposed between the first metal unit and the main ground layer, so that the signal layer is electrically connected to the main ground layer.

2. The excitation source planning method for the electrical simulation of claim 1, wherein the first metal unit has a length, the electromagnetic simulation software module comprises a length threshold, and the length of the first metal unit is less than or equal to the length threshold.

3. The excitation source planning method for the electrical simulation of claim 1, wherein the signal layer comprises a signal pad, and the electromagnetic simulation software module sets the first metal unit to be connected to a first surface, a second surface or a third surface of the signal pad.

4. The excitation source planning method for the electrical simulation of claim 3, wherein the signal layer further comprises a plurality of ground pads, and in the extending step,
   in response to determining that the signal pad is not electrically connected to the main ground layer through the first metal unit, the electromagnetic simulation software module executes a bridge port establishing step, and the bridge port establishing step is performed to reset the excitation source to be horizontally disposed between the signal pad and one of the ground pads, so that the signal pad is electrically connected to the one of the ground pads.

5. The excitation source planning method for the electrical simulation of claim 4, wherein the electromagnetic simulation software module sets the excitation source to be horizontally disposed between the signal pad and the one of the ground pads according to a component database.

6. The excitation source planning method for the electrical simulation of claim 4, wherein in the bridge port establishing step,
   in response to determining that the signal pad is not electrically connected to the one of the ground pads, the electromagnetic simulation software module executes an L-shaped port establishing step, and the L-shaped port establishing step is performed to provide a second metal unit to be horizontally connected to the main ground layer and to reset the excitation source to be vertically disposed between the signal pad and the second metal unit, so that the signal layer is electrically connected to the main ground layer.

7. The excitation source planning method for the electrical simulation of claim 6, wherein in the L-shaped port establishing step,
   in response to determining that the signal pad is not electrically connected to the main ground layer through the second metal unit, the electromagnetic simulation software module executes a finger port establishing step, and the finger port establishing step is performed to provide a third metal unit to be vertically disposed on the one of the ground pads, to provide a fourth metal unit to be horizontally disposed on the third metal unit and to reset the excitation source to be vertically disposed between the fourth metal unit and the signal pad, so that the signal pad is electrically connected to the one of the ground pads.

8. An excitation source planning system for an electrical simulation, which is configured to plan an excitation source, the excitation source planning system for the electrical simulation comprising:
   a memory configured to access a printed circuit board (PCB) layout and an electromagnetic simulation software module, wherein the PCB layout comprises a signal layer and a main ground layer; and
   a processing unit electrically connected to the memory, wherein the processing unit is configured to implement an excitation source planning method for an electrical simulation comprising:
      performing a layout importing step to import the PCB layout stored in the memory to the electromagnetic simulation software module;
      performing a port establishing step to execute the electromagnetic simulation software module, so that the electromagnetic simulation software module sets the excitation source to be vertically disposed between the signal layer and the main ground layer; and
      performing a model generating step to execute the electromagnetic simulation software module, so that the electromagnetic simulation software module performs the electrical simulation according to the excitation source to generate a three-dimensional simulation model corresponding to the PCB layout;
   wherein in the port establishing step, in response to determining that the signal layer is not electrically connected to the main ground layer, the electromagnetic simulation software module executes an extending step, and the extending step is performed to provide a first metal unit to be connected to the signal layer and to reset the excitation source to be vertically disposed between the first metal unit and the main ground layer, so that the signal layer is electrically connected to the main ground layer.

9. The excitation source planning system for the electrical simulation of claim 8, wherein the first metal unit has a length, the electromagnetic simulation software module comprises a length threshold, and the length of the first metal unit is less than or equal to the length threshold.

10. The excitation source planning system for the electrical simulation of claim 8, wherein the signal layer comprises a signal pad, and the electromagnetic simulation software module sets the first metal unit to be connected to a first surface, a second surface or a third surface of the signal pad.

* * * * *